United States Patent
Kaihotsu et al.

(10) Patent No.: US 9,551,436 B2
(45) Date of Patent: Jan. 24, 2017

(54) PROTECTIVE GUIDE FOR CABLES AND BRACKET USED FOR THE PROTECTIVE GUIDE

(71) Applicant: DENSO WAVE INCORPORATED, Chita-gun, Aichi-pref. (JP)

(72) Inventors: Kouichi Kaihotsu, Osaka (JP); Hiroshi Matsuoka, Nagoya (JP)

(73) Assignees: DENSO WAVE INCORPORATED, Aichi-pref (JP); TSUBAKIMOTO CHAIN CO., Osaka (JP)

( * ) Notice: Subject to any disclaimer, the term of this patent is extended or adjusted under 35 U.S.C. 154(b) by 222 days.

(21) Appl. No.: 13/621,579

(22) Filed: Sep. 17, 2012

(65) Prior Publication Data
US 2013/0075128 A1    Mar. 28, 2013

(30) Foreign Application Priority Data
Sep. 26, 2011   (JP) ................................. 2011-208574

(51) Int. Cl.
| F16B 5/02 | (2006.01) |
| F16L 3/015 | (2006.01) |
| H02G 3/04 | (2006.01) |
| H02G 11/00 | (2006.01) |

(52) U.S. Cl.
CPC ............ *F16L 3/015* (2013.01); *H02G 3/0475* (2013.01); *H02G 11/006* (2013.01); *F16B 5/0225* (2013.01)

(58) Field of Classification Search
USPC ................... 248/200, 205.1, 220.21, 220.22, 220.41,248/224.51, 224.61, 224.8, 65, 72, 73; 174/68.1, 97, 99 R
See application file for complete search history.

(56) References Cited

U.S. PATENT DOCUMENTS

| 2,658,247 | A | * | 11/1953 | Heuer | .............................. 248/73 |
| 3,011,748 | A | * | 12/1961 | Breuer | .......................... 248/265 |
| 3,468,509 | A | * | 9/1969 | Foltz | ........................... 248/316.6 |
| 4,114,158 | A | * | 9/1978 | Verini | ........................... 343/715 |

(Continued)

FOREIGN PATENT DOCUMENTS

| CN | 1194683 A | 9/1998 |
| JP | A-2001-514725 | 9/2001 |
| WO | WO 98/40645 A1 | 9/1998 |

OTHER PUBLICATIONS

Feb. 15, 2015 Chinese Office Action issued in Chinese Application No. 201210345732.5.

*Primary Examiner* — Alfred J Wujciak
(74) *Attorney, Agent, or Firm* — Oliff PLC

(57) ABSTRACT

A protective guide internally holds long members including at least one of flexible cable and duct to move in harmonization with the movement needed by the long members. The guide includes a flexible long plate-shaped base made of a synthetic resin and having a longitudinal direction, flexible sectioning members made of a synthetic resin, and two brackets. The sectioning members uprise from ends of the base, spaced apart from each other by gaps in the longitudinal direction, the ends facing in a direction perpendicular to the longitudinal direction, and cooperatively define a space for accommodating the long members along the base. The brackets detachably connect ends of the base to fixed and movable members of a machine installing the guide. Each bracket has a first engaging means detachably engaging the bracket with the gaps and a second engaging means detachably connecting the bracket to the fixed or movable member.

4 Claims, 9 Drawing Sheets

(56) References Cited

U.S. PATENT DOCUMENTS

| | | | | |
|---|---|---|---|---|
| 4,192,062 A | * | 3/1980 | Balde et al. | 29/857 |
| 4,332,433 A | * | 6/1982 | Balde et al. | 439/425 |
| 4,885,774 A | * | 12/1989 | Brancati | 379/439 |
| 6,161,373 A | | 12/2000 | Heidrich et al. | |
| 6,167,689 B1 | | 1/2001 | Heidrich et al. | |
| 6,371,424 B1 | * | 4/2002 | Shaw | 248/222.12 |
| 6,717,055 B2 | * | 4/2004 | Kato | 174/72 A |
| 7,312,395 B1 | * | 12/2007 | Gretz | 174/54 |
| 7,878,463 B2 | * | 2/2011 | Kauppila | 248/65 |
| 7,971,833 B2 | * | 7/2011 | Utaki et al. | 248/49 |
| 8,020,821 B2 | * | 9/2011 | Chen et al. | 248/220.22 |
| 8,215,595 B2 | * | 7/2012 | Li | 248/74.2 |
| 8,448,829 B2 | * | 5/2013 | Watanabe | 224/547 |
| 8,727,289 B2 | * | 5/2014 | Abbott | 248/74.4 |
| 2003/0052234 A1 | * | 3/2003 | Nakagawa et al. | 248/49 |
| 2004/0050734 A1 | * | 3/2004 | Kao | 206/370 |
| 2009/0108157 A1 | * | 4/2009 | Spencer | 248/222.13 |
| 2009/0321608 A1 | * | 12/2009 | Melton et al. | 248/674 |
| 2010/0140428 A1 | * | 6/2010 | Vassallo | 248/220.21 |
| 2011/0284285 A1 | * | 11/2011 | Miura et al. | 174/70 R |
| 2013/0167351 A1 | * | 7/2013 | Zimmer et al. | 29/428 |

\* cited by examiner

PROTECTIVE GUIDE FOR CABLES AND BRACKET USED FOR THE PROTECTIVE GUIDE

CROSS-REFERENCE TO RELATED APPLICATION

This application is based on and claims the benefit of priority from earlier Japanese Patent Application No. 2011-208574 filed Sep. 26, 2011, the description of which is incorporated herein by reference.

BACKGROUND OF THE INVENTION

Technical Field of the Invention

The present invention relates to a flexible protective guide for guiding the behaviors of flexible cables and/or ducts to a given path, while protecting the cables and/or ducts, the cables and/or ducts connecting a fixed side of a machine in which the protective guide is installed to a movable side of the machine to transmit electrical signals therebetween or transfer a physical medium therebetween, and relates to a bracket used for the protective guide. In particular, the present invention relates to a flexible protective guide preferable for an application in which cables and/or ducts are bent for connection between a fixed side of a machine in which the protective guide is installed and a movable side of the machine, and relates to brackets used for the protective guide.

Related Art

It is well known that various machines available today are provided with a movable member, such as a linear actuator or a robot, which is connected, for actuation, to a member on a fixed side (hereinafter referred to as a fixed member) of the machine. In most of such machines, energy, such as electrical power, control signals and/or air, are required to be transferred to the movable member from the fixed member via cables and/or ducts (hereinafter just referred to as cables). Since the cables are connected between the fixed member and the movable member, it is important to guide the movement of the cables to a desired path, with the protection of the cables.

In order to take measures against these problems, JP-A-2001-514725 suggests a cable protective member. The protective member is configured by segments each of which is formed by injection-molding a synthetic resin into a flat one-piece structure. These segments are mutually connected via bendable bridges so that the protective member is foldable.

However, in the foldable cable protective member of JP-A-2001-514725, each segment is provided by injection-molding a synthetic resin into a one-piece flat structure. Therefore, the injection-molded segments have to be folded one by one and the folded segments have to be assembled. Thus, troublesome work is involved in the assemblage. It is desirable that both ends of the protective member are detachably connected to the fixed frame and the movable frame of a machine installing the protective member. However, since the protective member obtained by folding and assembling the segments has a complicated structure, the brackets used for connecting the protective member to the frames necessarily have a complicated structure. Accordingly, lots of troublesome work is involved in mounting the brackets to the protective member. Moreover, in spite of low efficiency processes, the resultant connection of the protective member to the frames is unstable, allowing the protective member to easily come off from the frames.

SUMMARY

Thus it is desired to provide brackets for a protective guide that is used for cables and/or ducts, which bracket much facilitates the works of connecting a protective guide to a machine that installs the protective guide, hardly allow the protective guide to come off from the machine once the brackets are connected and, in spite of having a simple structure, enable detachable connection of the protective guide, via its ends, to the machine, and to provide a protective guide using such a bracket.

In order to achieve the above object, as one exemplary embodiment, a long protective guide is provided, which internally holds long members that include at least one of a flexible cable and a flexible duct to move in harmonization with a movement needed by the long members. The long protective guide includes: a flexible curved strip-shaped base made of a synthetic resin and formed into a shape of a long plate having a longitudinal direction; a plurality of flexible sectioning members made of a synthetic resin and spaced apart from each other by gaps in the longitudinal direction of the curved strip-shaped base, the sectioning members uprising from both sides of the curved strip-shaped base and cooperatively defining a space for accommodating the long members along the curved strip-shaped base, both sides of the curved strip-shaped base being opposed to each other in a direction perpendicular to the longitudinal direction; and two brackets that detachably connect both ends of the curved strip-shaped base to a fixed member and a movable member of a machine installing the protective guide. Each of the two brackets includes a first engaging means that detachably engages the bracket with the gaps and a second engaging means that detachably connect the bracket to the fixed member or the movable member.

In achieving the object, another exemplary embodiment is provided as a bracket. The bracket is provided which detachably connects each of both end portions of a long protective guide to a corresponding one of a fixed member and a movable member of a machine installing the long protective guide, the long protective guide internally holding long members that include at least one of a flexible cable and a flexible duct and moving in harmonization with a movement needed by the long members. Each of the brackets includes: a plate-shaped first link member that is inserted and arranged in a space which is used by the protective guide to internally hold the long members therein; a plate-shaped second link member that is integrally formed with the first link member in a longitudinal direction of the first link member with a step being formed therebetween, and has a thickness larger than that of the first link member; a first engaging means that is projected from the first link member and can be engaged with gaps formed in portions of a space-forming member that forms the space, the first engaging means detachably engaging the space-forming member with the first link member; and a second engaging means that is arranged outside the space and detachably brings the second link member into engagement with the fixed member or the movable member.

DETAILED DESCRIPTION OF THE PREFERRED EMBODIMENTS

With reference to FIGS. 1 to 11, hereinafter is described an embodiment of a cable protective guide according to the present invention. The cable protective guide includes brackets for connecting the cable protective guide to a machine that installs the cable protective guide.

The cable protective guide is installed in a machine that includes a movable member, such as a linear guide or a robot, which is driven being connected to a member on a fixed side (hereinafter referred to as a fixed member). Such a machine is required to transfer energy, such as electrical power, control signals and/or air, from the fixed member to the movable member via cables and/or ducts (hereinafter just referred to as cables). Since the cables are connected between the fixed member and the movable member, it is important to protect the cables and to guide their movement to a desired path. Thus, the cable protective guide of the present embodiment has a role of protecting and guiding the cables accordingly.

Figure 1:
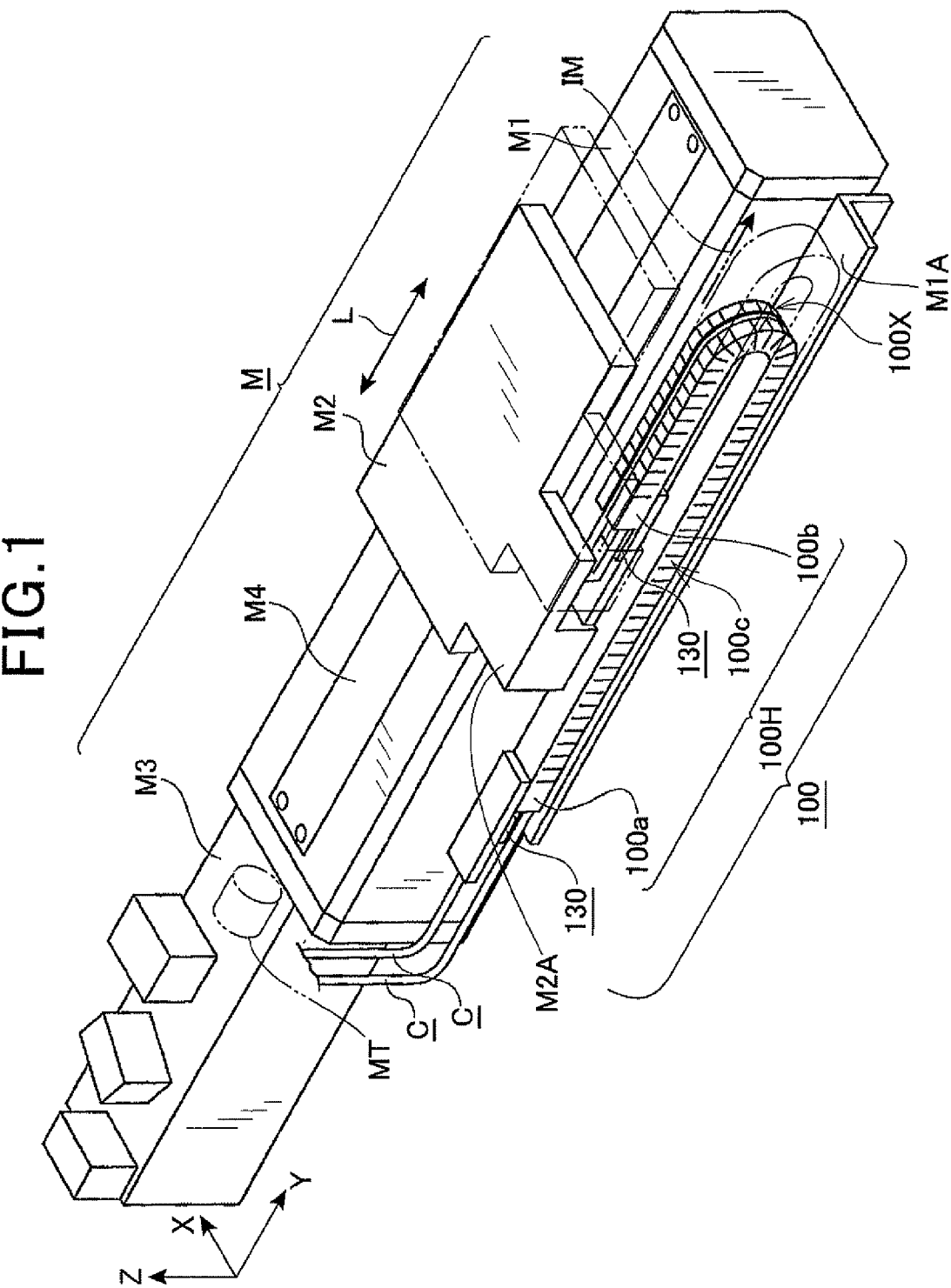
FIG. 1 is a perspective view illustrating an example of a device mounting a protective guide for cables (including brackets for the connection of the protective guide), according to an embodiment of the present invention.

Hereinafter, the cable protective guide is specifically described. FIG. 1 is a perspective view illustrating a linear movement device M called a liner robot mounting a cable protective guide 100 according to the present embodiment.

The linear movement device M incorporates a ball-screw driven actuator. Specifically, as shown in FIG. 1, the linear movement device M includes a fixed frame M1, a movable member M2, a setting frame M3 and an actuator M4. The fixed frame M1 is provided on a machine side. The movable member M2 is a movable frame provided on the machine side. The setting frame M3 is connected to the fixed frame M1 and incorporates a drive motor MT. The actuator M4 is a ball-screw driven actuator for linearly moving the movable member M2 with respect to the fixed frame M1. Upon rotation of the drive motor MT incorporated in the setting frame M3, the actuator M4 is driven. In response to the driving, the movable member M2 is linearly, i.e. parallelly, moved with respect to the fixed frame M1.

As shown in FIG. 1, an X-Y-Z coordinate system is set, in which the longitudinal direction of the fixed frame M1 coincides with the Y-axis direction. The movable member M2 is allowed to reciprocally move along the Y-axis direction (see the arrow L in FIG. 1).

As shown in FIG. 1, of the two side faces of the fixed frame M1, which are opposed to each other in the X-axis direction, one is provided with a mounting plate M1A. Specifically, the mounting plate M1A having an L-shaped cross section as viewed in the longitudinal direction is secured to one of the side faces of the fixed frame M1, with a side face of the mounting plate M1A being oriented upward in the Z-axis direction. Further, of the two side faces of the movable member M2, which are opposed to each other in the X-axis direction, one is provided with a cantilever M2A. Specifically, the cantilever M2A having an upside-down L-shaped cross section as viewed in the X-axis direction is secured to one of the side faces of the movable member M2. Thus, the mounting plate M1A and the cantilever M2A are opposed to each other in the Z-axis direction on a side face of the linear movement device M. Accordingly, when the movable member M2 moves in the Y-axis direction with respect to the fixed frame M1, the cantilever M2A also moves in the Y-axis direction with respect to the mounting plate M1A (see the arrow L in FIG. 1).

The movable member M2 includes electrical and mechanical elements, such as elements that consume electrical power and electronically controlled elements, which are necessary for achieving the functions of the actuator M4. Accordingly, the actuator M4 is provided with long flexible members, such as cables/ducts C including: a cable that has two ends, one being connected to the fixed frame M1 and the other being connected to the movable member M2 to supply electrical power from the side of the fixed frame M1 to the side of the movable member M2; a cable that transmits signals between the fixed frame M1 and the movable member M2; and other necessary ducts. Hereinafter, the cables/ducts C are simply referred to as cables C. The cables C move in a spatial manner with the movement of the movable member M2. Therefore, the linear movement device M includes the cable protective guide 100 which protects the cables C and guides the movement (behaviors) of the cables C within a desired path.

Specifically, as shown in FIG. 1, the cable protective guide 100 includes a guide body 100H and two brackets 130. The guide body 100H has flexibility and has a long shape. The two brackets 130 are mounted on both ends of the guide body 100H and used for fixedly is connecting the both ends of the guide body 100H to the movable member M2 and the fixed frame (support) M1. In the present embodiment, the two brackets 130 have an identical structure. The guide body 100H has a long shape and has ends 100a and 100b. The guide body 100H has substantially a rectangular cross section perpendicular to the longitudinal direction, with a hollow substantially approximate to a rectangular shape, as viewed in the longitudinal direction, being formed inside. The hollow serves as a path through which the cables C are permitted to move.

In this way, as shown in FIG. 1, the ends 100a and 100b of the guide body 100H are secured to the mounting plate M1A and the cantilever M2A, respectively, via the brackets 130. The portion of the guide body 100H other than the ends 100a and 100b corresponds to a trunk 100c. A part of the trunk 100c is placed on the upper surface of the mounting plate M1A. Specifically, the long cable protective guide 100 is mounted on the linear movement device M being bent forming a U-shaped bent portion 100X (part of the trunk 100c) along the Y-Z plane. Accordingly, when the movable member M2 is translated with respect to the fixed frame M1, the cable protective guide 100 is permitted to move, changing the position of the U-shaped bent portion 100X on the mounting plate M1A (see the dash-dot-dot line IM in FIG. 1).

The cable protective guide 100 is designed to have a given rigidity. Therefore, before being mounted on the linear movement device M, the cable protective guide 100 naturally keeps its substantially linear shape. Thus, it is true that the cable protective guide 100 is able to keep its substantially linear shape without being placed on the mounting plate M1A but, for the sake of protection from other machines or members in the factory, the cable protective guide 100 is placed on the mounting plate M1A.

The cables C are passed through the hollow (space R described later) of the cable protective guide 100 from the side of the fixed frame M1 for connection to the side of the movable member M2.

Referring to FIGS. 2 to 8, hereinafter are specifically described the configuration and advantages of the guide body 100H of the cable protective guide 100.

The material used for manufacturing the protective member 100H may only have to be a synthetic resin which is able to hold long flexible members, such as cables/ducts, and is excellent in mechanical strength and molding accuracy. For example, the materials that may be used include polyolefin-based resins, such as polyethylene or polypropylene, polyimide-based resins, polyester-based resins, polyacryl-based resins, polyacetal-based resins, polyvinyl chloride-based resins and polystyrene-based resins. In manufacturing the protective member 100H, a resinous material as mentioned above is processed, first, using an extruding machine or a drawing machine. Through the extruding or drawing process, a monolithic tubular member is prepared in which a curved strip-shaped base 110 is integrated with a plurality of wall portions 120 in series. Each wall portion 120 includes side walls 121A and 121B on both sides in the X-axis direction and a ceiling 122 that is integrally connected with a corresponding one of the side walls. In this case, the die used in the processing machine is formed so that the die can form a curved portion 110A in the base 110.

Figure 2:
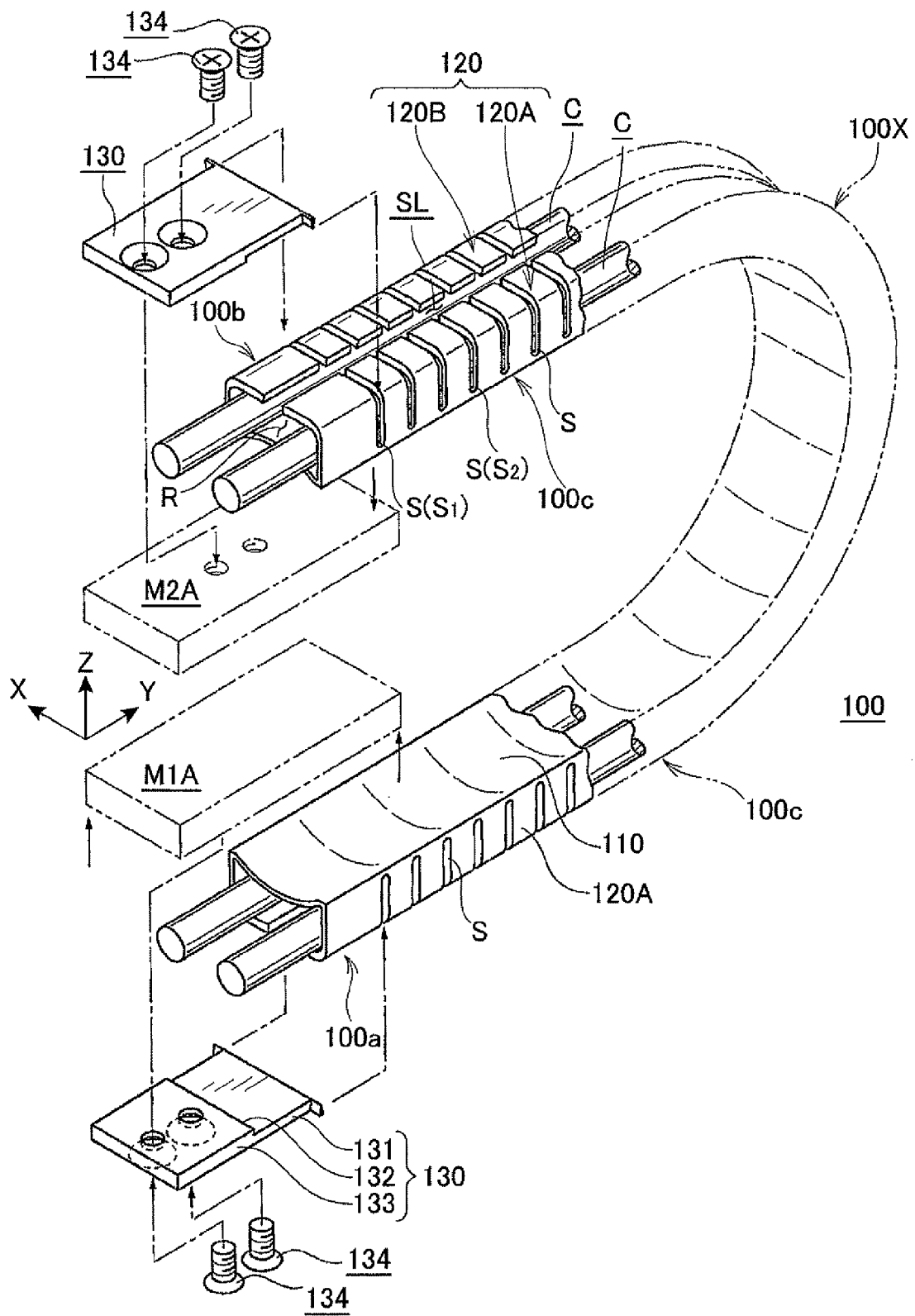
FIG. 2 is a partially omitted perspective view more specifically illustrating the general shape of the protective guide according to the embodiment.
Figure 3:
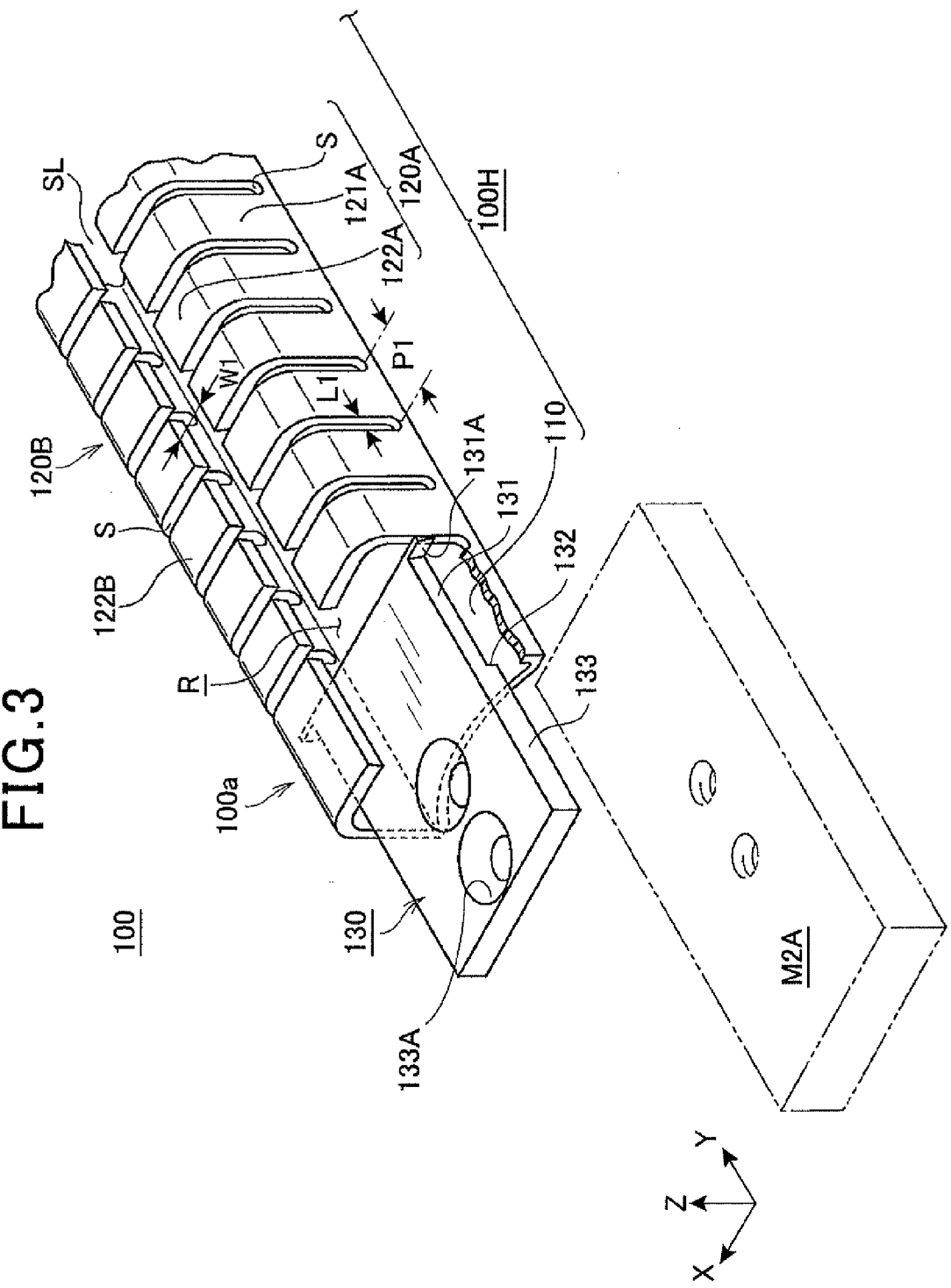
FIG. 3 is a partial perspective view illustrating a linear-posture portion of the protective guide according to the embodiment.

The ceilings 122 of the tubular member prepared in this way are processed using a slicer to form a first slit SL along the longitudinal direction, i.e. the Y-axis direction, as shown in FIGS. 2 and 3, having a predetermined width W1 (e.g., several millimeters). One first slit SL is provided. The first slit SL is formed so as to be located at the center of each of the ceilings 122 in the width direction, i.e. the X-axis direction. The first slit SL is formed for the purpose of allowing a bent portion 100X of the cable protective guide 100 to exert a part of the function of absorbing distortion (or strain) caused by the bending. The bent portion 100X corresponds to a portion of the cable protective guide 100, which portion keeps a state of being bent and changes its position in the cable protective guide 100 with the movement of the guide.

Figure 5:
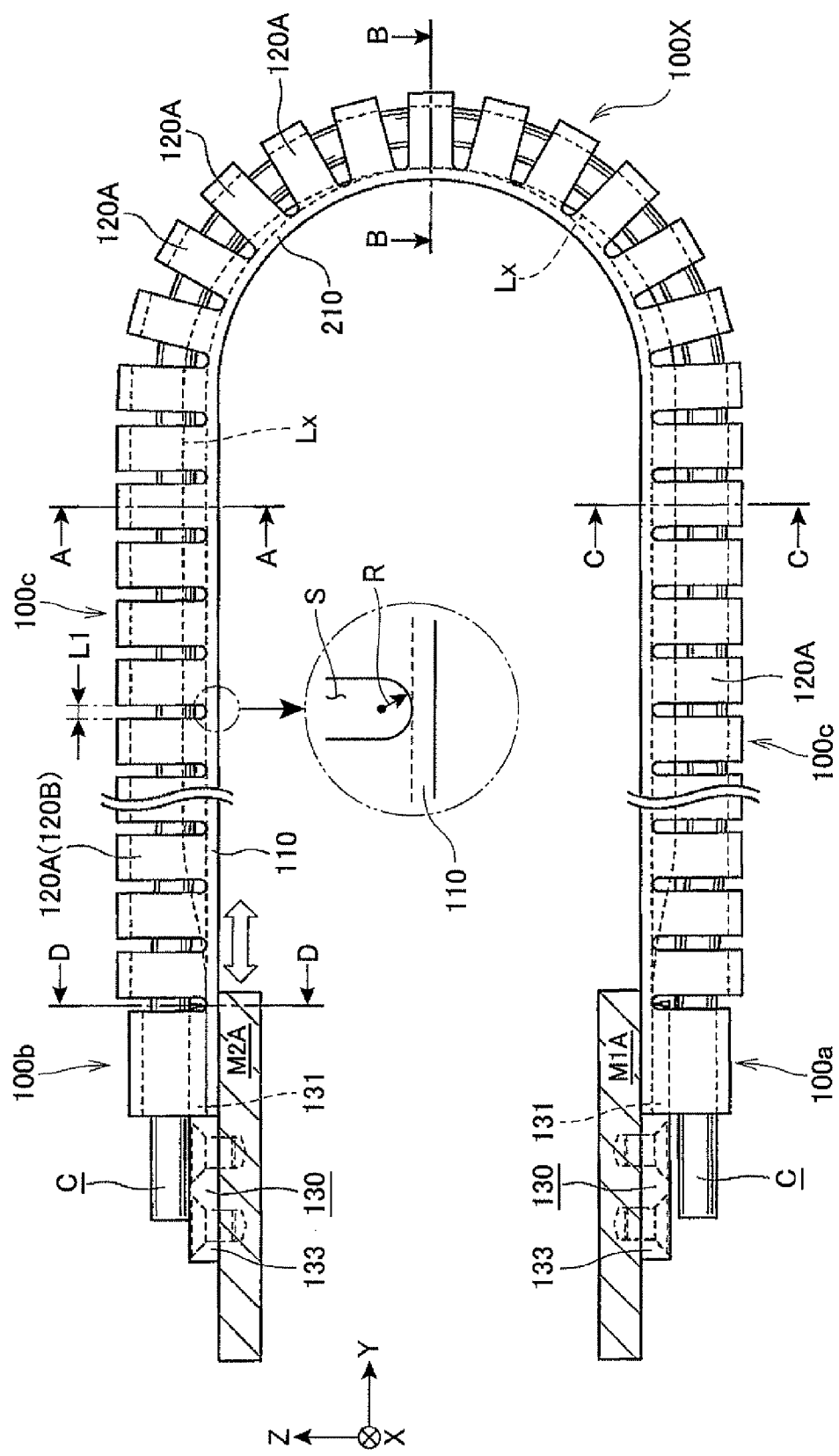
FIG. 5 is a side view illustrating in general the protective guide including a bent portion, according to the embodiment.

Then, the tubular member in which the first slit SL has been formed is processed using another slicer to form a plurality of second slits (gaps) S each having a predetermined width L1 (e.g., 1 mm). The second slits S are arranged in the Y-axis direction at a predetermined pitch P1. The plurality of second slits S are also formed for the purpose of allowing the bent portion 100X of the cable protective guide 100 to exert a part of the function of absorbing distortion (or strain) caused by the bending. Each of the plurality of second slits S is formed throughout the height of each wall portion 120 and has a dead end reaching the base 110. As shown in FIG. 5, the dead end of each second slit S has a rounded portion R (see a label R).

As a result, the guide body 100H is provided with the side walls 121A and 121B mentioned above and ceiling counterparts 122A and 122B forming the ceiling 122 mentioned above. Specifically, the side walls 121A and 121B integrally uprise from respective ends of the curved strip-shaped base 110, which ends are opposed to each other in the width direction, i.e. the X-axis direction, of the base 110. The side walls 121A and 121B uprise from the respective ends by a given height in the Z-axis direction. The side walls 121A and 121B are bent, each forming substantially an L shape to extensively provide the ceiling counterparts 122A and 122B, respectively.

Specifically, as viewed in the Y-axis direction, a space R (the hollow) having substantially a rectangular cross section is formed for accommodation of the cables C. The substantially rectangular cross section is defined by the base 110 as its lower long side (or upper long side), the side walls 121A and 121B as its short sides, and the ceiling counterparts 122A and 122B as its upper long side (or lower long side). The ceiling counterparts 122A and 122B form a single ceiling 122 and are opposed to each other in the ceiling 122 via the first slit SL.

Thus, a pair of side walls 121A and 121B and a pair of ceiling counterparts 122A and 122B configure a single wall portion 120 (i.e. a single sectioning member). The plurality of wall portions 120 are formed integrally with the base 110 and arranged in the longitudinal direction of the base 110 at a regular interval corresponding to the width L1. As mentioned above, the pair of ceiling counterparts 122A and 122B form a single ceiling 122. Accordingly, the plurality of wall portions 120 are arranged in the longitudinal direction, i.e. the Y-axis direction, of the guide body 100H at a regular interval corresponding to the width L1. Each of the plurality of wall portions 120 may be interpreted as being configured by L-shaped sectioning member counterparts (right and left side walls) 120A and 120B, which configure the single sectioning member (wall portion) 120 and set up integrally with the base 110, at the left and right ends in the X-axis direction of the base 110.

Figure 6:
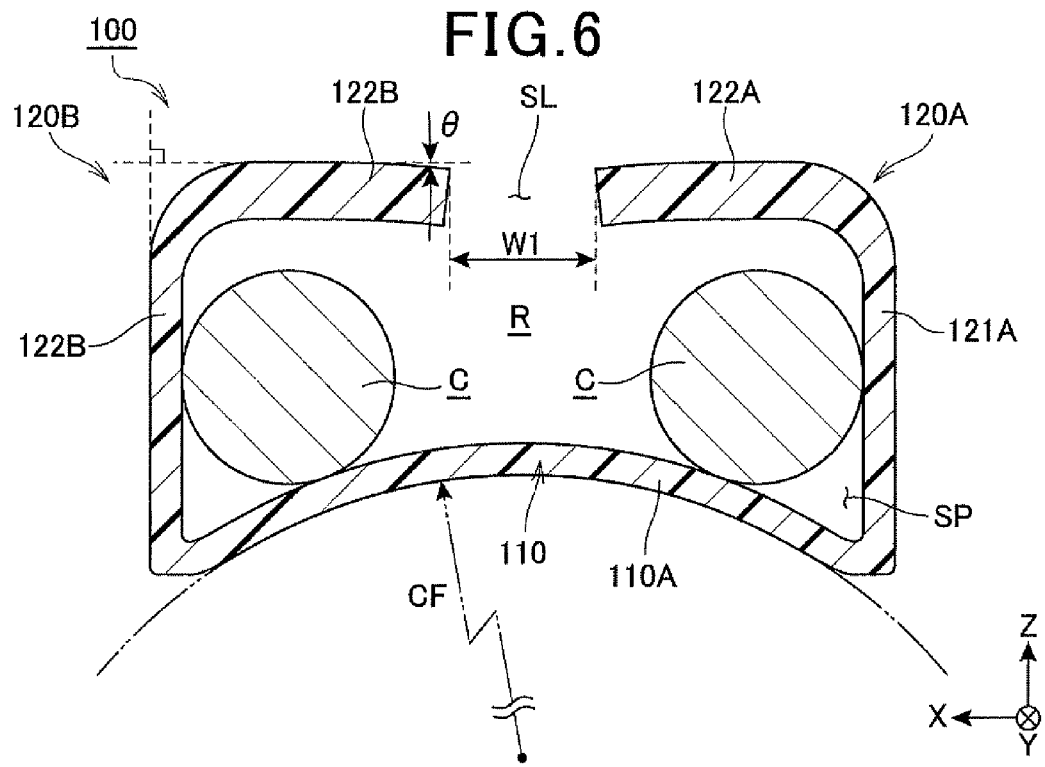
FIG. 6 is a cross-sectional view illustrating a cross section corresponding to a linear posture, taken along a line A-A of FIG. 5.
Figure 7:
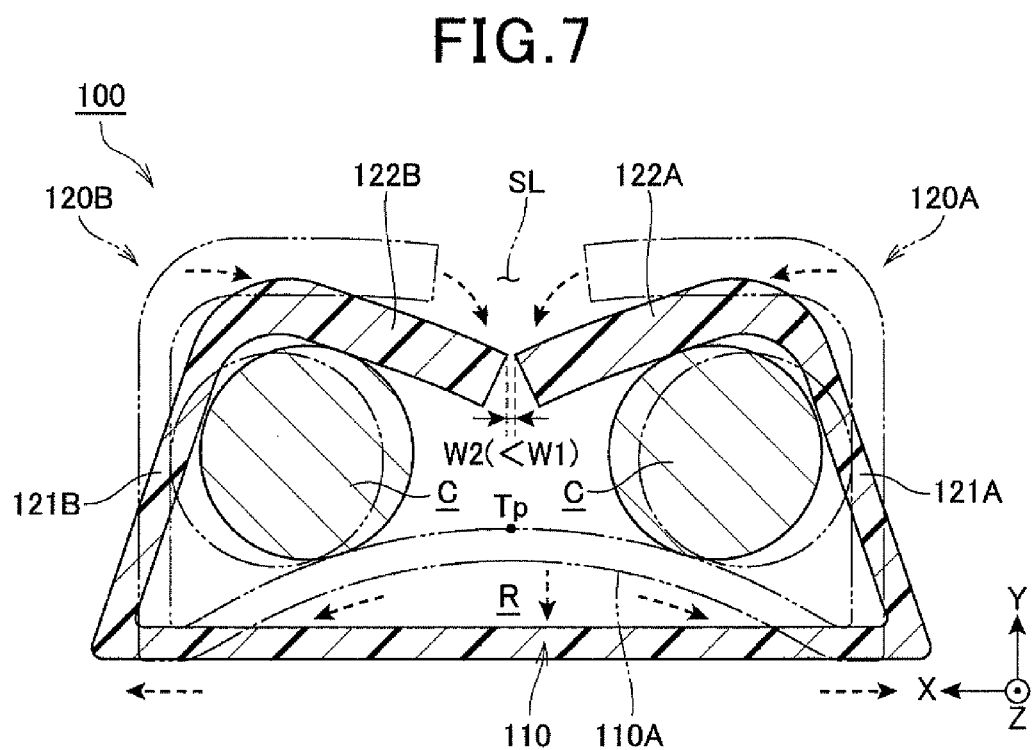
FIG. 7 is a cross-sectional view illustrating a cross section corresponding to a bent posture, taken along a line B-B of FIG. 5.
Figure 8:
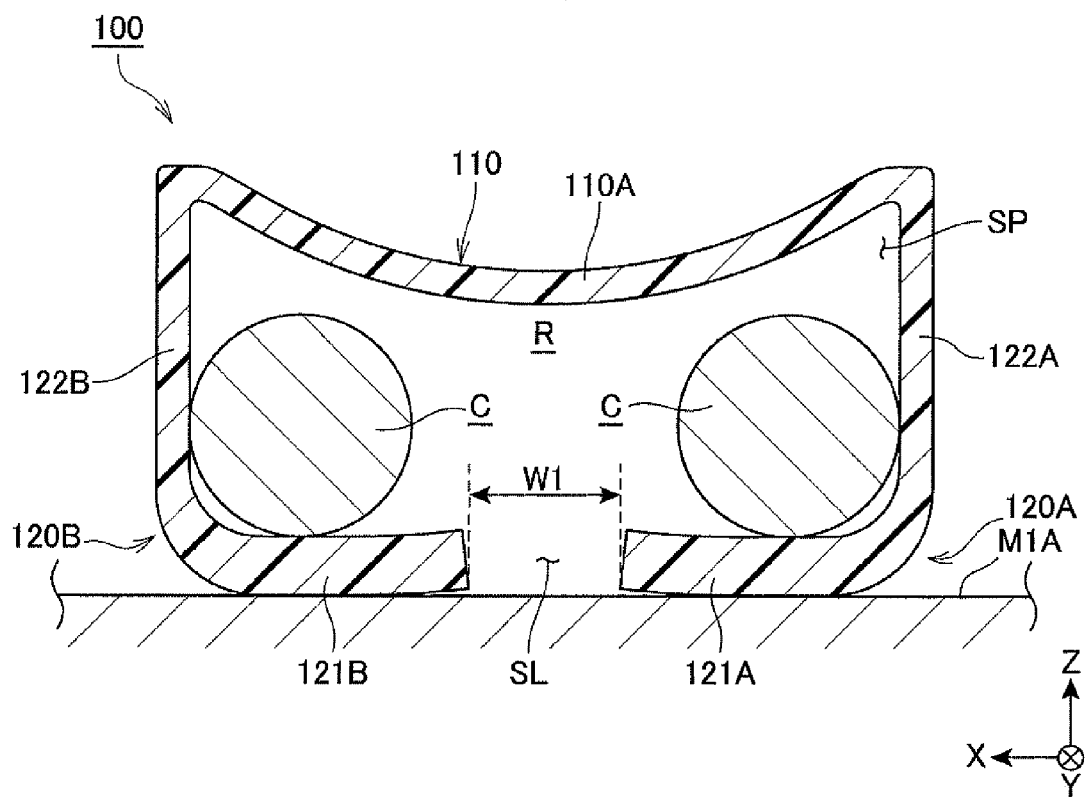
FIG. 8 is a cross-sectional view illustrating a cross section corresponding to another linear posture, taken along a line C-C of FIG. 5.

However, more precisely, the base 110, as viewed in the cross section of the space R, is formed as shown in FIGS. 6 to 8. Specifically, the entire base 110 is entirely inwardly curved in its width direction at a constant curvature CF. This curve is given by a die used in the manufacture. Each of the ceiling counterparts 122A and 122B is sharply bent inward by an angle θ with respect to an angle orthogonal to the side wall 121A (121B). The sharp bending provides the ceiling counterparts 122A and 122B with higher durability against an outwardly applied pressing force.

In the guide body 100H, i.e. the cable protective guide 100, configured in this way, when the movable member M2 linearly moves in the Y-axis direction with respect to the fixed frame M1, the end 100b of the guide body 100H also moves in the Y-axis direction. With this movement, the position of the bent portion 100X of the cable protective guide 100 changes in the Y-axis direction.

Figure 4:
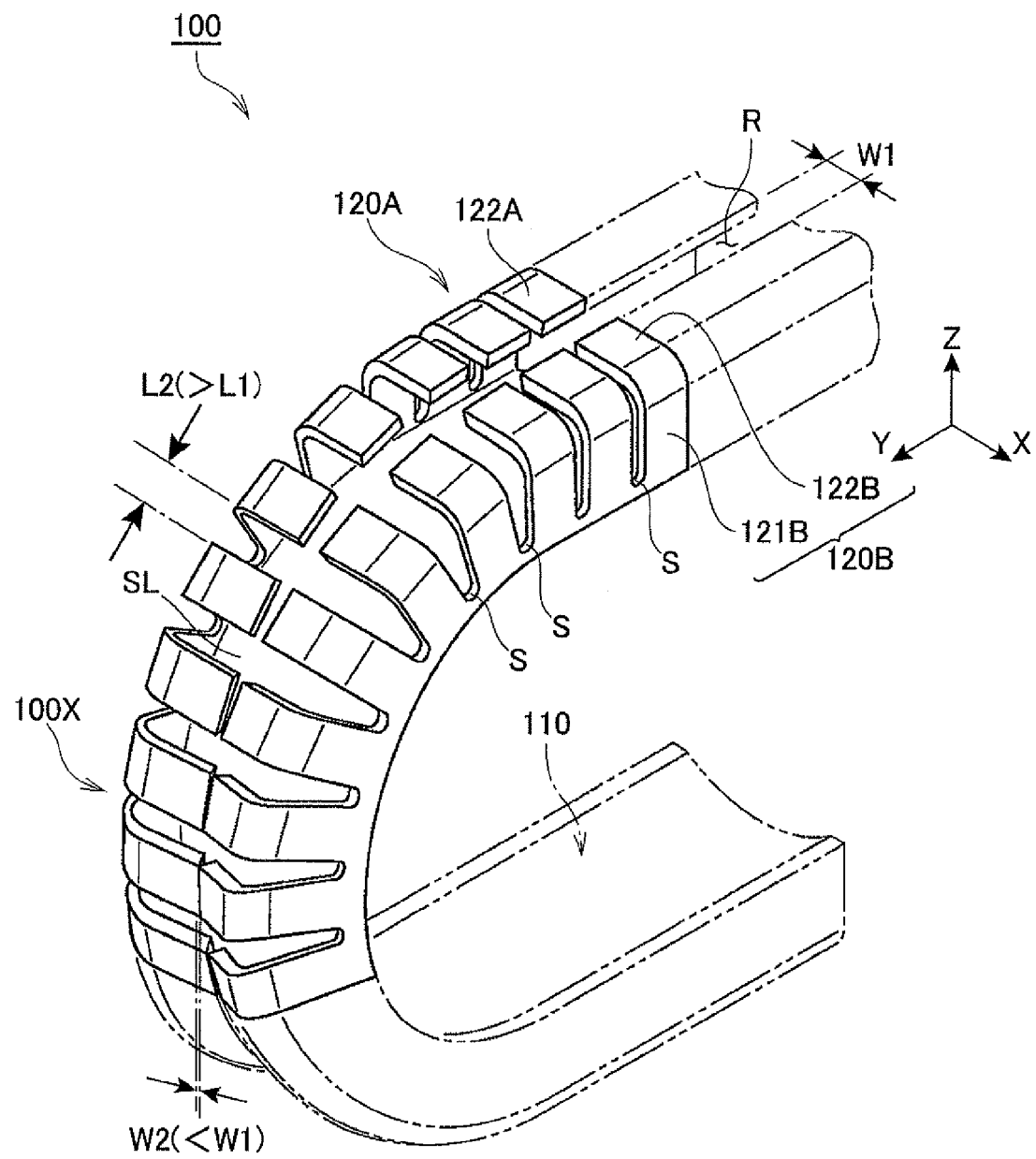
FIG. 4 is a partial perspective view illustrating a bent-posture portion of the protective guide according to the embodiment.

As shown in FIGS. 6 and 8, in the guide body 100H, its linear-posture portion has a substantially rectangular cross section along the X-Z plane, with its upper or lower long side being curved. However, as the bent portion 100X moves and approaches the linear-posture portion, several second slits S in the vicinity of the bent portion 100X begin to become larger than the width L1 maintained up to then. At the same time, the first slit SL in the vicinity of the bent portion begins to become narrower than the width W1. Then, upon arrival of the bent portion 100X, the second slits S becomes as large as a predetermined width L2 (>L1) at a portion having the highest degree of bending. At the same time, the width W1 of the first slit SL substantially becomes equal to zero. Thus, as the second slits S are widened and as the first slit SL is narrowed, the distortion (or strain) caused by the bending of the bent portion 100X is more reliably absorbed by the elastic deformation. In this case, as shown in FIGS. 4 and 7, the cross section of the bent portion 100X perpendicular to the longitudinal direction, i.e. the cross section along the X-Z plane, is flattened in the base 110. In response, the side walls 121A and 121B are inclined inward, in response to which, the ceiling counterparts 122A and 122B are also inclined inward to narrow the width W1 of the first slit SL to a width W2 (<W1) which is substantially zero.

In other words, as indicated by the solid line in FIG. 7, the base 110 is flattened and the ceiling counterparts 122A and 122B are inclined inward, compared to the cross section in the linear-posture portion as shown in FIG. 6. As a result, the cross section changes to substantially a trapezoidal shape. In this way, owing to the narrowing of the first slit SL, widening of the second slits 5, flattening of the base 110 and the inward inclination of the ceiling counterparts 122A and 122B, the components of the cable protective guide 100 are able to disperse their distortion (or strain) caused by the bending. At the same time, the cable protective guide 100 is able to smoothly change its posture from linear to bent. Since such a smooth bending is enabled in the cable protective guide 100, the cables C accommodated in the internal space R are guided in harmonization with the movement of the space R (path), while being protected by the cable protective guide 100. Thus, the movable member M2 as well is able to move in a smooth manner.

By the way, in FIG. 5, a dashed line Lx (which should be drawn partly by two-dot chain lines in FIG. 5) shows how the top position Tp of the curved portion 110A (refer to FIG. 7) changes in its Z-axial height as advancing from the linear posture to the curved posture along the longitudinal positions of the cable protective guide 100.

Figure 9:
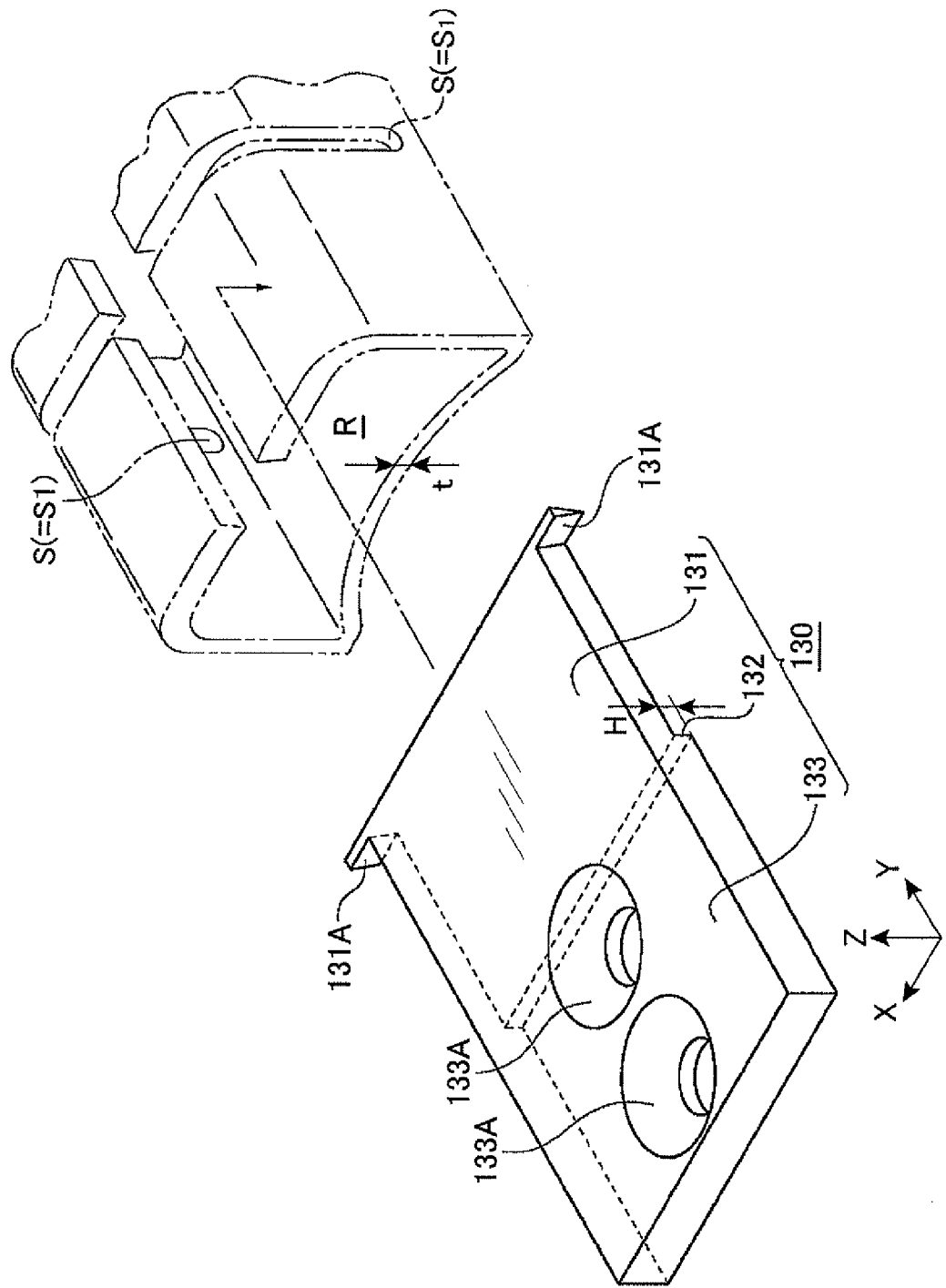
FIG. 9 is a perspective view illustrating a bracket for a protective guide, according to an embodiment of the present invention.
Figure 10:
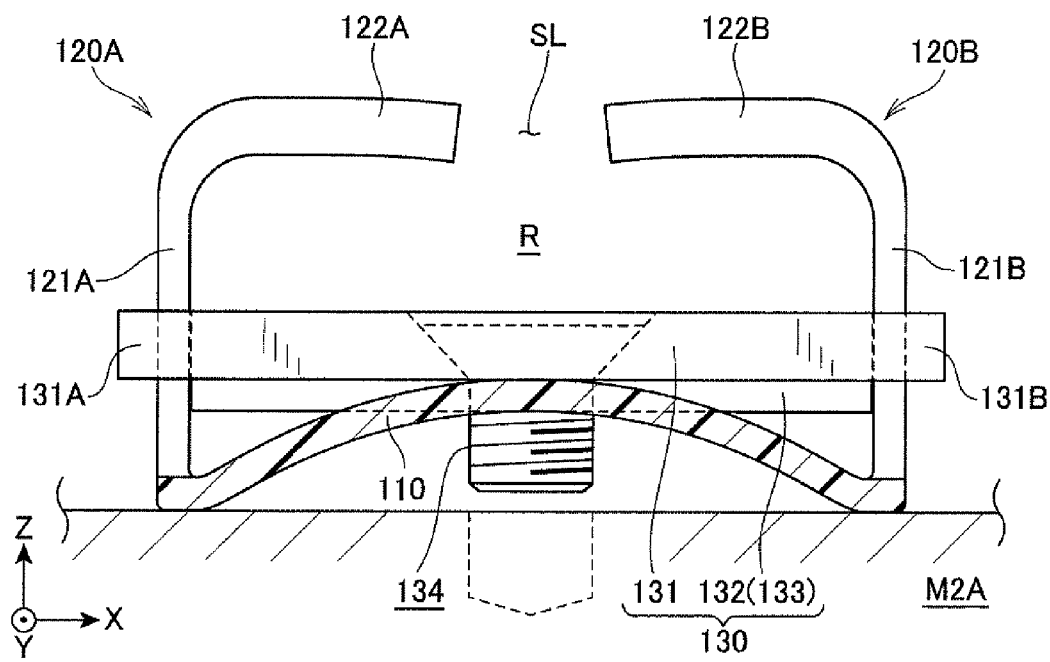
FIG. 10 is a cross-sectional view illustrating a positional relationship between the bracket and the protective guide before the bracket is engaged with the guide, taken along a line D-D of FIG. 5.
Figure 11:
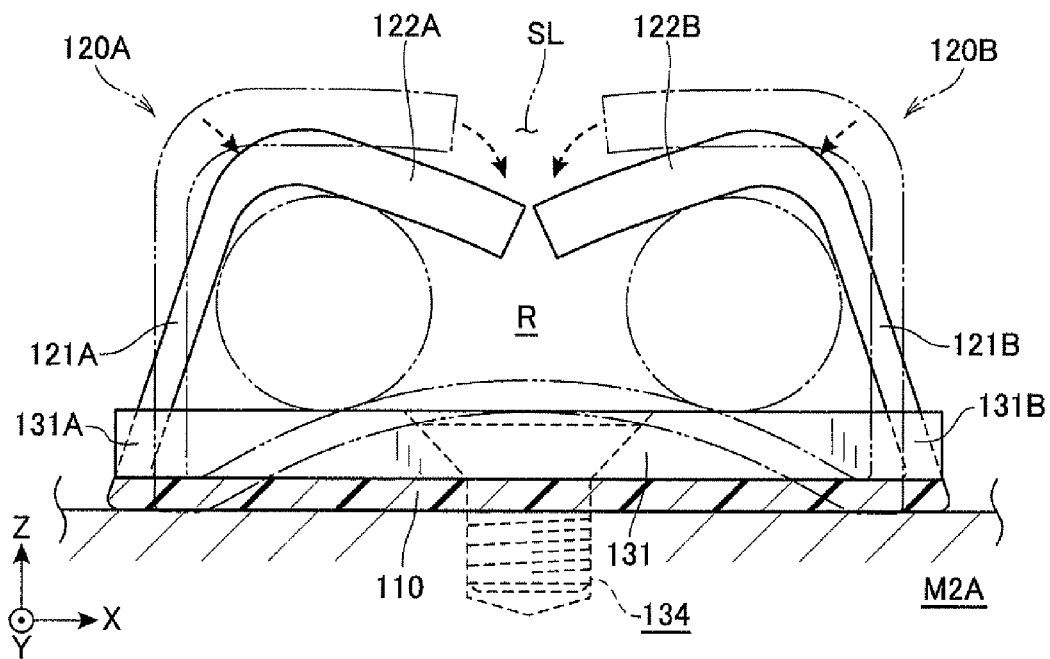
FIG. 11 is a cross-sectional view (after the bracket has been engaged) taken along the line D-D of FIG. 5.

Referring now to FIGS. 9 to 11, hereinafter are described the brackets 130 which are connected to the ends 100a and 100b of the guide body 100H. Of the two brackets 130, one bracket 130 is detachably connected between the end 100a of the guide body 100H and the mounting plate MA of the fixed frame M1. The other bracket 130 is detachably connected between the end 100b of the guide body 100H and the cantilever M2A on the movable side. The two brackets 130 have an identical structure.

As shown in FIG. 9, each bracket 130 (hereinafter also just referred to as the bracket 130) has substantially a rectangular shape in its entirety, i.e. substantially has a plate-shaped shape, and serves as a connecting member. The bracket 130 may be formed of a synthetic resin selected from the ones mentioned above, or may be formed of a metal material. In the present embodiment, the bracket 130 has no flexibility but, if necessary, may have flexibility of a predetermined degree.

As shown in FIG. 9, the bracket 130 includes a first plate member 131 and a second plate member 133. The first plate member 131 serves as a first link member placed inside the space R of the guide body 100H. The second plate member 133 is integrally formed with the first plate member 131 via a step 132. The second plate member 133 is placed adjacent to the guide body 100H, i.e. placed outside the guide body 100H. When the Y axis indicated in FIG. 9 is the longitudinal direction of the bracket 130, the first and second plate members 131 and 133 are integrally formed in the longitudinal direction interposed by a step 132.

The step 132 has a height H which is equal to the thickness of the base 110, i.e. a thickness t of the curved portion 110A (more precisely, equal to the thickness of the curved portion 110A in a flattened state). The step 132 has a step face linearly extending along the width direction, i.e. the X-axis direction, of the bracket 130. The bracket 130 has a width which is set to a value that allows at least the first plate member 131 to be inserted into the space R. The bracket 130 has a length in the longitudinal direction, which is set so that a tip end portion of the first plate member 131 reaches a first slit $S_1$ (see FIG. 9) of the plurality of second slits S and that the second plate member 133 will have a predetermined length.

Thus, the first plate member 131 can be inserted into the space R with the step 132 being in contact with the base 110. Specifically, in this case, the step 132 is fitted to a tip end of the guide body 100H, i.e. a tip end of the base 110 in a flattened state, of the cable protective guide 100. Thus, when the positions on the cantilever M2A for screwing screws 134 (described later) are predetermined, the position of the guide body 100H is determined with respect to the bracket 130. In other words, the step face of the step 132 functions as a positioning face.

Further, as shown in FIG. 9, the tip end portion of the first plate member 131 has ends in the width direction, which are provided with projections 131A that can be fitted to the first slit $S_1$. Also, as shown in FIG. 9, the second plate member 133 is provided with two screw holes (through holes) 133A and 133A at respective two positions in the longitudinal direction.

Accordingly, connection of the cable protective guide 100 is conducted as set forth below. The first plate member 131 of the bracket 130 is inserted into the space R of the cable protective guide 100. In this case, the first plate member 131 is placed on the curved portion 110A of the base 110, with the left and right projections 131A and 131A being inserted into the first slit $S_1$. Thus, the first plate member 131 is engaged with the first slit $S_1$, while being in contact with the base 110. The engagement is easily achieved by bowing the sectioning member counterparts 120A and 120B. As a result, the bracket 130 is detachably engaged with the guide body 100H via the two left and right projections 131A and 131A (see FIGS. 9 and 10). In this case, the second plate member 133 alone is jutted out of an end portion of the cable protective guide 100 in the longitudinal direction.

Then, the second plate member 133 is place at a is predetermined position of the cantilever M2A on the movable side, followed by screwing the screws 134 into the respective screw holes 133A and 133A to detachably connect the second plate member 133 to the cantilever M2A. Thus, the second plate member 133 is pressed against the cantilever M2A without forming any gap therebetween.

Accordingly, as shown in FIG. 11, the base 110 and the two sectioning member counterparts 120A and 120B at the end 100a of the cable protective guide 100 are elastically deformed. Specifically, due to the pressing of the cantilever M2A, the first plate member 131 allows the curved portion 110A of the base 110 to be flattened. Further, a portion of a predetermined length of the curved portion 110A from its tip end is fitted to the step 132, while being fixed onto the cantilever M2A, being pressed from above by the first plate member 131. As a result, the end 100a of the cable protective guide 100 is detachably connected to the cantilever M2A, i.e. the movable member M2, using the bracket 130.

The other end 100b of the cable protective guide 100 is also detachably connected to the mounting plate M1A, i.e. the fixed frame M1, in a similar manner using the other bracket 130.

The cable protective guide 100 exerts various advantages.

First of all, the cable protective guide 100 can eliminate the necessity of preparing a cable protective guide on the worksite by assembling members as in the conventional art. In the cable protective guide 100 according to the present embodiment, the curved strip-shaped base 110 and the plurality of wall portions 120 are formed as a monolithic member. Therefore, the assembling workload as mentioned above is eliminated and thus the working efficiency is enhanced accordingly.

The plurality of second slits S are formed at the even pitch P1 throughout the cable protective guide 100 in its longitudinal direction. Thus, the cable protective guide 100 may be cut off at any second slit S so as to match the length of the accommodated cables C. In other words, the cable protective guide 100 only has to be cut off according to the application. Thus, there is no necessity of preparing various types of cable protective guides in advance. Accordingly, only a simple workload on the worksite can provide the cable protective guide 100 of a desired length. In this way, the cable protective guide 100 having good general-purpose properties can be provided.

Further, since the cable protective guide 100 is formed using extruding or drawing, the curved strip-shaped base 110 has a high degree of molecular orientation in the longitudinal direction. In this way, the cable protective guide 100 has high fatigue strength in the longitudinal direction and thus has an excellent durability as well accordingly.

Moreover, in performing extruding or drawing, the thickness and size can be changed in the base 110 and/or the wall portions 120 of the cable protective guide 100. In addition, the material for forming the cable protective guide 100 can be selected as appropriate. In this way, in guiding the cables C with the protection thereof, an optimum mode of a path, i.e. the space R, is obtained in conformity with the type and the number of the cables C desired to be accommodated.

Further, use of a synthetic resin material in manufacturing the cable protective guide 100 enables continuous processing using extruding or drawing, while ensuring a steady mode in the space R for accommodating the cables C.

Further, as shown in FIGS. 4, 6 and 8, the base 110 has the curved portion 110A as far as the cable protective guide 100 maintains its linear posture. Accordingly, a space SP having a slightly sharp-angled cross section is formed between an uprising portion at each end of the curved portion 110A and the side wall 121A or 121B. Therefore, at least a part of the cables C is accommodated in each of the narrow spaces SP. The sharp-angled spaces SP have high rigidity owing to the shape, wall thickness, and the like. The high rigidity contributes to supporting the cables C so that the cables C can have a linear shape in the longitudinal direction. Thus, in guiding the cables C in the linear-posture portion of the cable protective guide 100, the linear posture of the cables C is reliably maintained.

In the bent portion 100X of the cable protective guide 100, the curved strip-shaped base 110 is flattened and the ceiling counterparts 122A and 122B are inclined inward. As a result, the first slit SL will have the width W2 which is substantially zero, i.e. the gap between the ceiling counterparts 122A and 122B is substantially closed. Thus, the first slit SL provided for facilitating the bending of the cable protective guide 100 can contribute to preventing the cables C from being pushed outward and departing from the cable protective guide 100.

As described above, in the present embodiment, the shape and size of the curved strip-shaped base 110 and the wall portions 120 are set so that the space R is sufficiently ensured for the accommodation of the cables C. This acts synergistically with the structure unique to the present embodiment. Specifically, the cable protective guide 100 (i.e. the cables C) constantly has, in the space R: a portion in which the cables C keep a linear posture; a portion in which the posture of the cables C turns from linear to bent; a portion in which the cables C keep a bent posture; a portion in which the posture of the cables C turns from bent to linear again; and a portion in which the posture of the cables C returns to linear again. In the present embodiment, the portions involving the bent posture exert an effect of allowing the first slit LS and the second slits S to absorb the distortion (or strain) caused by the bending and an effect of flattening the curved portion 110A.

As described above, the cable protective guide 100 has, in the space R, a portion in which the cables C keep a linear posture or a portion in which the cables C keep a bent posture. Between these portions, there is not so much a significant change in the shape and size of the space R, except the change that the curved portion 110A is flattened and the ceiling counterparts 122A and 122B are inclined inward. Thus, the present embodiment provides an appropriate model which is able to accept both of the linear and bent postures of the cable protective guide 100, with the space R (path) being fully ensured inside. Accordingly, the space R in the model is able to suppress a backlash accompanying the movement of the cables C.

Specifically, as described above, the position of the U-shaped bent portion 100X changes with the movement of the movable member M2. Thus, wherever the bent portion 100X may be positioned, the cable protective guide 100 is able to constantly enclose the cables C and guide the movement of the bent portions of the cables C.

Further, when a plurality of cables C are accommodated in the space R, the curved portion 110A in the linear-posture portion of the cable protective guide 100 can exert its function of fixing the accommodation positions of the plurality of cables in the space R. Specifically, the inclination of the curved portion 110A exerts a function of preventing the plurality of cables C accommodated in the space R from moving spontaneously in the direction along the X-Z plane (movement of crossing the cables C). More specifically, during the operation of the linear movement device M, the positions of the cables C along the X-Z plane remain as they are initially accommodated in the space R. For this reason, the plurality of cables C are suppressed from interfering with each other or suffering from contact friction. Thus, while the cables C are prevented from departing from the bent portion 100X, a cable guide of a smooth and stable movement is realized.

Further, the plurality of wall portions 120 having an identical shape are arranged at an even pitch along the longitudinal direction of the curved strip-shaped base 110. This configuration allows the cable protective guide 100 to more effectively exert its function of narrowing the width of the first slit SL, widening the width of the second slits S, and flattening the curved portion 110A. As a result, with the movement of the movable member M2, the position of the U-shaped bent portion 100X is shifted in the Y-axis direction, while the U shape of the sole bent portion 100X is reliably maintained. Thus, the cables C are protected and guided in a stable manner.

Furthermore, the plurality of wall portions 120 are spaced apart from each other by the second slits S. The base portion, i.e. the dead end, of each of the plurality of second slits S reaches the curved strip-shaped base 110. This configuration much more enhances the effect of absorbing distortion (or strain) caused by the bending in the bent portion 100X. Thus, the bent portion 100X can have a smaller curvature radius. For this reason, the space occupied by the cable protective guide 100 is made smaller.

In addition, since the dead end of each second slit S has the rounded portion R, the distortion (or strain) applied to the base portion (dead end) of each second slit S is effectively and evenly dispersed in the periphery. Thus, the durability of the cable protective guide 100 is enhanced.

On the other hand, in the cable protective guide 100 of the present embodiment, the ends 100a and 100b of the cable protective guide 100 can be detachably connected to the movable member M2 and the fixed frame M1, respectively, using the brackets 130. Accordingly, good workability is ensured in connecting the cable protective guide 100 to the movable member M2 and the fixed frame M1, compared to cable protective guides of conventional art. Since the cable protective guide 100 can be easily detached by removing the brackets 130, the efficiency is enhanced in the replacement and maintenance of the cables C.

In engaging one end of each bracket 130 with the cable protective guide 100, the bracket 130 makes use of the second slit S for the engagement, which slit is originally formed for dispersing the distortion (or strain) caused in the cable protective guide 100 by its bending. Further, the bracket 130 is structured by simply connecting two plate members 131 and 133 via the step 132. Accordingly, the structure of the bracket 130 in its entirety is very simple. Thus, the cable protective guide 100 is easily manufactured at lower cost.

In the cable protective guide 100 using the brackets 130, the first plate member 131 of each bracket 130 is engaged with the guide body 100H via the projections 131A. At the same time, accompanying the screwing of the screws 134, the first plate member 131 is pressed against an end portion of the curved strip-shaped base 110. Thus, the guide body 100H is reliably prevented from coming off from the brackets 130.

Further, the formation of the step 132 can absorb the thickness of the base 110 to permit the upper surfaces (facing the cables C to be guided) of the first and second plate members 131 and 133 to be on the same one plane. Thus, the structure of the end portions of the guide is more simplified without having a complicated concavo-convex structure for connecting the guide to the brackets 130. The simplified structure can reduce the friction that would be caused by the movement of the cables C. Further, the one-plane structure of each bracket 130 can prevent narrowing of the space (space R) for passing the cables C therethrough.

Furthermore, the second plate member 133 is entirely brought into contact with and fixed to the cantilever M2A of the movable member M2, forming no gap between the cantilever M2A and the second plate member 133. Avoiding formation of gap contributes to reducing or preventing the vibration and noise that would be caused by the gap in expanding or bending the protective cable 100.

In addition, as described above, the step 132 also exerts a function of determining the position of the guide body 100H with respect to the bracket 130 (when the positions of the screw holes are predetermined). Accordingly, connection of the cable protective guide 100 is more accurately and efficiently conducted. Also, since the cable protective guide 100 is accurately arranged at a predetermined position, the cable protective guide 100 is prevented from moving in a serpentine manner. Also, the positioning function of the bracket 130 can guarantee the directionality in the longitudinal direction in linking between the guide body 100H and each bracket 130, while reducing the loosening therebetween.

The cable protective guide and the brackets used for the cable protective guide of the present invention are not structurally limited to the embodiment described above, but may be variously modified. For example, the left and right projections 131A provided to the first plate member 131 in its width direction may be arranged in two rows in the longitudinal direction. Specifically, the first plate member 131 shown in FIG. 9 may be elongated in the longitudinal direction and projections may be provided in two rows in the longitudinal direction so as to be engaged with the firstly and secondly located second slits S. This will enhance the engaging strength of each bracket 130 to the guide body 100H.

Further, the gaps in the guide body 100H, with which the projections of the guide 130 are engaged, do not necessarily have to be shared from the second slits S. For example, engagement holes, such as gaps, dedicated to such an engagement may be provided in the first and second sectioning member counterparts 122A and 122B and/or the curved strip-shaped base 110.

Also, the positions of the screw holes 133A formed in the second plate member 133 are not limited to the positions shown in FIG. 9. For example, a plurality of screw holes 133A may be formed in the second plate member 133, being juxtaposed in its width direction.

In the foregoing embodiment, the first slit SL may be omitted, so that the ceiling counterparts 122A and 122B are formed as a single strip-shaped ceiling member. In such a case, it is preferred that the single ceiling member is inwardly curved in the same manner as the base 110 when being seen in the Y axis direction. This curved ceiling member is also effective for making the U-shaped bent portion 100X smooth in its bent action.

The present invention may be embodied in several other forms without departing from the spirit thereof. The embodiments and modifications described so far are therefore intended to be only in illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A bracket for an elastic protective cable guide having an inner space, the bracket comprising:
    a first plate-shaped link member:
    a second plate-shaped link member integrally formed with the first plate-shaped link member;
    a first engaging member formed to be integral with the first plate-shaped link member and project from the first plate-shaped link member; and
    a second engaging member which detachably engages the second plate-shaped link member with a corresponding either one of a fixed member and a movable member, wherein
    the elastic protective cable guide presents a longitudinal direction, the elastic protective cable guide having an inner space extending in the longitudinal direction, a single curved strip-shaped base, and a plurality of sectioning members each having a ceiling opposed to the curved strip-shaped base, elongated members being accommodated through the inner space, the elongated members including at least either one of a flexible cable and a flexible duct, the curved strip-shaped base being elastically curved toward the inner space in a section perpendicular to the longitudinal direction, the plurality of sectioning members (i) being integrally built on lateral edges of the strip-shaped base, (ii) providing the inner space together with the curved strip-shaped base, and (iii) being separated from one another by slits in the longitudinal direction, the bracket is composed of a pair of brackets detachably connecting, respectively, two end portions of the elastic protective cable guide to the fixed member and the movable member, the elastic protective cable guide moving together with a movement of the elongated members when the movable member moves, the first plate-shaped link member is inserted and located in the inner space in each of the end portions of the elastic protective cable guide, the second plate-shaped link member has a thickness larger than a thickness of the first plate-shaped link member such that a step is provided between the first plate-shaped link member and the second plate-shaped link member, which are mutually adjacent in the longitudinal direction, the step having a height equal to a thickness of the curved strip-shaped base such that the flattened curved strip-shaped base is allowed to be inserted between the first plate-shaped link member and either the fixed member or the movable member, the first engaging member is detachably engageable with the slits of the elastic protective cable guide, and the second engaging member detachably engages, outside the inner space, the second plate-shaped link member with the corresponding one of either the fixed member or the movable member.

2. The bracket according to claim 1, wherein:

the first plate-shaped link member and the second plate-shaped link member are integrally butted against one another so as to have the step therebetween in the longitudinal direction, and the step has a positioning face fitted to an end portion of the curved strip-shaped base of the elastic protective cable guide.

3. The bracket according to claim 2, wherein:

the second plate-shaped link member has holes located outside the inner space when the first plate-shaped link member and the second plate-shaped link member are loaded on the elastic protective cable guide, the first engaging member is composed of claws that integrally project from two lateral sides of the first plate-shaped link member and fit into the slits, and the second engaging member is composed of screws that detachably engage the second plate-shaped link member with the corresponding one of either the fixed member or the movable member via the holes.

4. The bracket according to claim 1, wherein:

the second plate-shaped link member has holes located outside the inner space when the first plate-shaped link member and the second plate-shaped link member are loaded on the elastic protective cable guide, the first engaging member is composed of claws that integrally project from two lateral sides of the first plate-shaped link member and fit into the slits, and the second engaging member is composed of screws that detachably engage the second plate-shaped link member with the corresponding one of either the fixed member or the movable member via the holes.

* * * * *